United States Patent [19]

Yamashita et al.

[11] Patent Number: 5,114,198
[45] Date of Patent: May 19, 1992

[54] SYNTHETIC RESIN BUMPER

[75] Inventors: Noboru Yamashita; Keiji Sugiura, both of Hamamatsu; Kazunori Shimomaki, Hamana; Toshiaki Takanishi, Kasai, all of Japan

[73] Assignee: Suzuki Motor Corporation, Shizuoka, Japan

[21] Appl. No.: 605,951

[22] Filed: Oct. 30, 1990

[30] Foreign Application Priority Data

Dec. 6, 1989 [JP] Japan .................. 1-316769

[51] Int. Cl.⁵ .............................. B60R 19/24
[52] U.S. Cl. .................. 293/120; 293/136; 293/155
[58] Field of Search ............... 293/120, 122, 121, 136, 293/154, 155

[56] References Cited

U.S. PATENT DOCUMENTS

| | | | |
|---|---|---|---|
| 3,706,468 | 12/1972 | Yoviene | 293/120 |
| 3,784,181 | 1/1974 | Nemec | 293/136 X |
| 3,869,167 | 3/1975 | Muller | 293/122 X |
| 3,997,207 | 12/1976 | Norlin | 293/122 X |
| 4,070,052 | 1/1978 | Ng | 293/120 X |
| 4,076,296 | 2/1978 | Ditto et al. | 293/122 |
| 4,082,338 | 4/1978 | Hutai et al. | 293/136 |
| 4,085,956 | 4/1978 | Weisshappel et al. | 293/136 |
| 4,186,915 | 2/1980 | Zeller et al. | 293/122 X |
| 4,348,042 | 9/1982 | Scrivo | 293/120 |
| 4,460,205 | 7/1984 | Glance | 293/136 X |
| 4,569,865 | 2/1986 | Placek | 293/120 X |
| 4,573,724 | 3/1986 | Campen | 293/136 |
| 4,580,811 | 4/1986 | Wykhuis et al. | 293/136 X |
| 4,592,580 | 6/1986 | Stanganelli et al. | 293/136 |
| 4,597,601 | 7/1986 | Manning | 293/122 |
| 5,005,887 | 4/1991 | Kelman | 293/155 X |

FOREIGN PATENT DOCUMENTS

| | | | |
|---|---|---|---|
| 1923305 | 10/1970 | Fed. Rep. of Germany | 293/122 |
| 102746 | 8/1980 | Japan | 293/120 |
| 2055446 | 3/1981 | United Kingdom | 293/120 |

*Primary Examiner*—Margaret A. Focarino
*Assistant Examiner*—Joseph D. Pape
*Attorney, Agent, or Firm*—McGlew & Tuttle

[57] ABSTRACT

According to the present invention, there is provided a synthetic resin bumper formed by fitting a resin made absorber having an enclosed cross section structure which is covered with a facing of a separate body to a car body by a pair of right and left brackets disposed on a rear face side thereof, wherein a flange is provided at a front end portion of each of above-mentioned brackets, and through holes formed by a side wall which reaches from a front face to a rear face are provided at portions of the absorber located within a scope where this flange is disposed.

4 Claims, 6 Drawing Sheets

SYNTHETIC RESIN BUMPER

FIELD OF THE INVENTION AND RELATED ART STATEMENT

The present invention relates to a synthetic resin bumper.

In general, a vehicle is provided with a synthetic resin bumper 51 as shown in FIG. 15 in order to prevent damage of a car body and to absorb an impulse force at the time of collision. This bumper 51 is constructed in the order of a facing 52, an absorber 53 made of resin foam and a reinforcement 54 made of a steel plate from an outer layer, and is fitted by clamp-fixing with bolts, etc. at fore and aft parts of the car body.

In the bumper 51 of this type, however, the reinforcement 54 is a metallic part extending in a width direction. Therefore, there is a drawback that the part cost becomes expensive in addition to increase in weight. Thus, a synthetic resin bumper 61 such as shown in FIG. 16 has heretofore come into use widely. This bumper 61 is constructed by assembling a facing 62, an absorber 63 which is a blow molding resin product and a bracket 64 made of a steel sheet (or made of resin) in this order.

In above-mentioned conventional synthetic resin bumper 61, however, the absorber 63 has an enclosed cross section structure, and brackets 64 are disposed on both right and left sides on the back of the absorber 63. Therefore, there has been such drawbacks that, when a vehicle comes into a head-on collision with a wall, etc., the absorber 63 at a portion corresponding to the bracket 64 is deformed largely as shown in FIG. 17, and the collision energy absorption effect is also lowered as compared with the bumper 51 using the reinforcement 54.

OBJECT AND SUMMARY OF THE INVENTION

It is an object of the present invention which has been made in view of above-described actual circumstances to provide a synthetic resin bumper which is able to eliminate drawbacks described above.

In order to solve the problems which have been heretofore involved in above-mentioned related art, according to the present invention, there is provided a synthetic resin bumper in which a resin made absorber having an enclosed cross section structure covered with a facing of a separate body is fitted to a car body by means of a pair of right and left brackets disposed on the rear face side of the absorber, wherein a flange is provided at the front end of above-mentioned bracket, and through holes formed by a side wall reaching from the front face to the rear face at the portion of the absorber located within the scope where this flange is disposed are provided.

A synthetic resin bumper according to the present invention is a resin product with the absorber having an enclosed cross section structure, which has a property of being restored to an almost original configuration after collision of a vehicle and has a stability even after repeated collision. Further, since through holes formed by a side wall reaching from a front face to a rear face are provided at a portion of the absorber located within the scope where the flange of the bracket is disposed, it is possible to absorb the collision energy in a short period of time at an early stage of the collision phenomenon as compared with a conventional bumper, and to suppress deformation of the whole bumper. In addition, a resin absorber having a simple enclosed cross section structure being used in a synthetic resin bumper of the present invention, it is possible to achieve light weight and low cost, and there is no fear of rusting as compared with a steel reinforcement structure. Moreover, since above-mentioned absorber is covered with a facing of a separate body, the through holes cannot be seen from the outside, thus causing no problem appearance-wise.

BRIEF DESCRIPTION OF THE DRAWINGS

FIG. 1 thru FIG. 7 show a first embodiment of the present invention, in which:

FIG. 1 is an exploded perspective view of a synthetic resin bumper, which shows a part of a car body and a bumper;

FIG. 2 is a plan view of an absorber and a bracket;

FIG. 3 is a sectional view taken along a line A—A in FIG. 2;

FIG. 4 is a sectional view taken along a line B—B in FIG. 2;

FIG. 5 is a front view of an absorber in the vicinity of through holes;

FIG. 6 is a plan view of an absorber at the time of collision;

FIG. 7 is a characteristic diagram showing the relationship between load and time at the time of collision of the absorber; and FIG. 8 thru FIG. 11 show a second embodiment of the present invention, in which:

FIG. 8 is a perspective view of an absorber before a lattice-formed structural body is inserted;

FIG. 9 is a plan view of an absorber when coming into collision under a state that lattice-formed structural bodies have been inserted;

FIG. 10 is a plan view of an absorber in the vicinity of through holes;

FIG. 11 is a characteristic diagram showing the relationship between load and time at the time of collision of an absorber; and FIG. 12 thru FIG. 14 show a third embodiment of the present invention, in which:

FIG. 12 is a perspective view of an absorber before projections of a bracket are inserted;

FIG. 13 is a plan view of an absorber when coming into collision under a state that projections of a bracket have been inserted; and FIG. 14 is a characteristic diagram showing the relationship between load and time at the time of collision of an absorber. Furthermore.

DETAILED DESCRIPTION OF PREFERRED EMBODIMENTS

Figure 1:
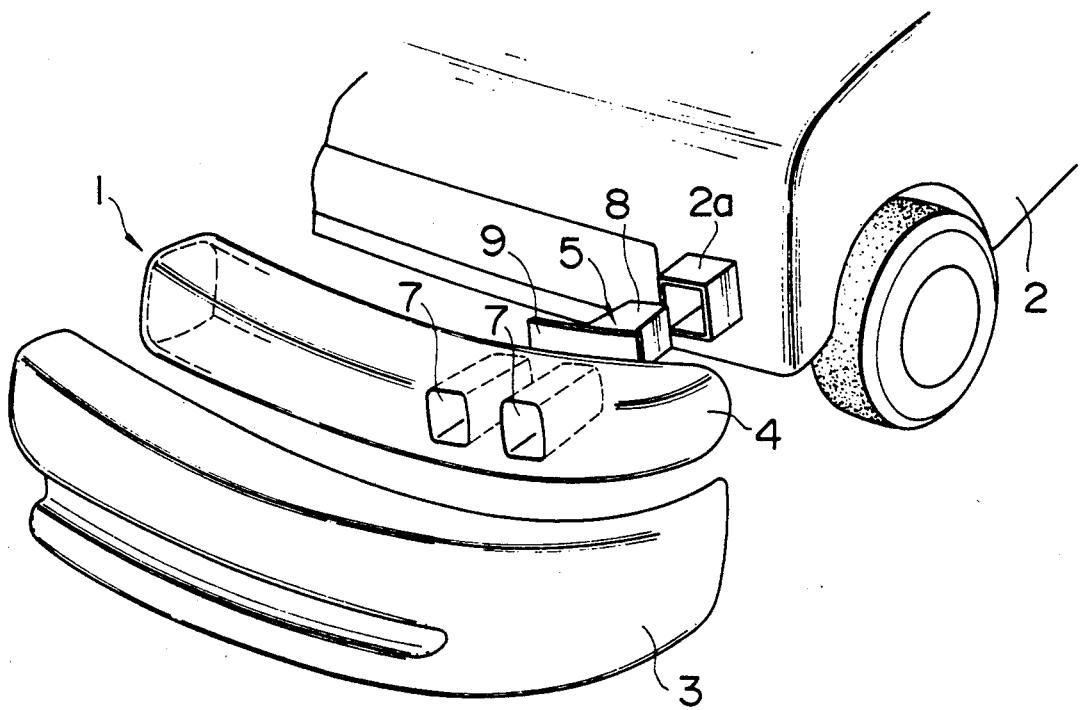
Figure 2:
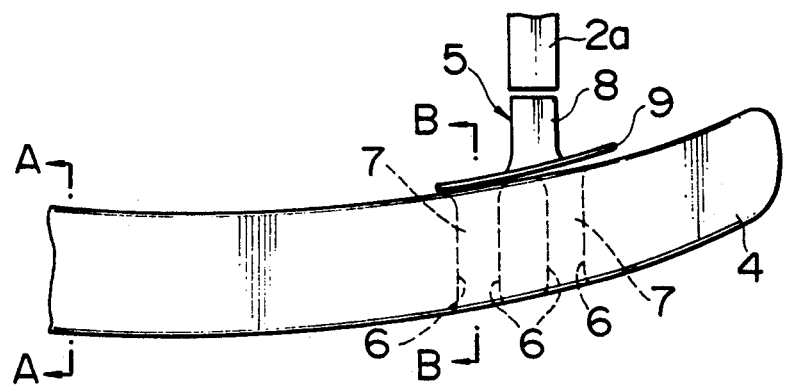
Figure 3:
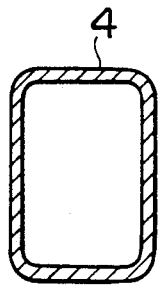
Figure 4:
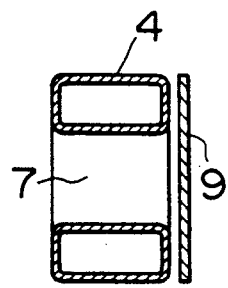

The present invention will be described in detail hereafter based on illustrated embodiments.

FIG. 1 thru FIG. 7 show a first embodiment of the present invention. In these figures, 1 denotes a synthetic resin front bumper fitted to a front fitting portion 2a of a car body 2, and above-mentioned front bumper 1 is composed of a facing 3, a resin made absorber 4 covered with the facing 3 of a separate body and a pair of right and left brackets 5 disposed on the rear face side of this absorber 4 arranged in order from an outer layer. An appropriate material such as metal, synthetic resin and leather is used for the facing 3.

Above-mentioned absorber 4 is a synthetic resin product having an enclosed cross section structure formed integrally by a blow molding method (a hollow molding method), which is formed in a size corresponding substantially to a front portion of the car body 2 along the car width direction. As the synthetic resin material for composing the absorber 4, polyethylene, polypropylene, polycarbonate, polybutylene phthalate, polyphenylane oxide and the like are used for instance.

Figure 5:
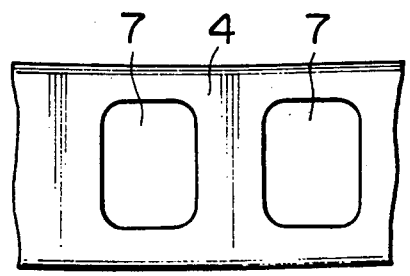

Further, two through holes 7 formed by a side wall 6 reaching from the front face to the rear face are provided on both right and left sides of above-mentioned absorber 4, and these through holes 7 are provided within a scope where a flange of a bracket 5 which will be described later is arranged. The through hole 7 is formed to have a front height which is from 10% to 80% of the total height of the absorber 4 as shown in FIG. 5 and in a rectangular configuration on the front having a front width of 10 to 100 mm. Besides, the number of the through holes 7 is not limited to two each on either side, but one or two and more through holes may be provided. Also, the front configuration of the through hole 7 may be square, ellipse, circle and so forth other than rectangle.

Above-mentioned bracket 5 consists of a substrate 8 fitted to a front fitting portion 2a of a car body 2 and a flange 9 provided integrally at the front end portion of this substrate 8, and the lateral size of the flange 9 is formed so as to stretch by 50 to 200 mm in right and left directions out of the front fitting portion 2a of the car body 2. Further, the rear face of the absorber 4 is fixed to the flange 9 of the bracket 5 by binding with a bolt, etc. not shown.

Figure 6:
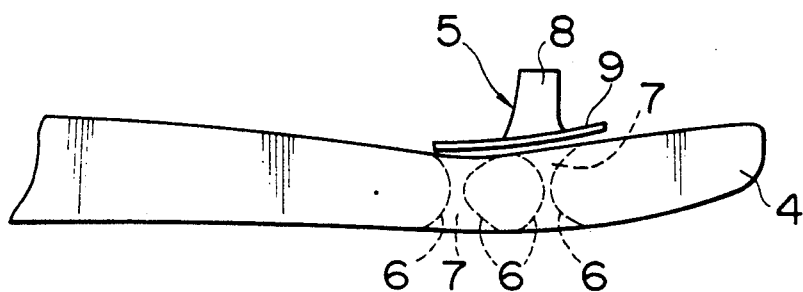
Figure 7:
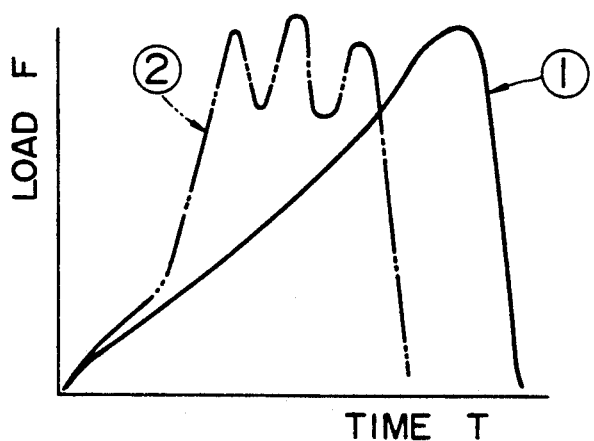
Figure 8:
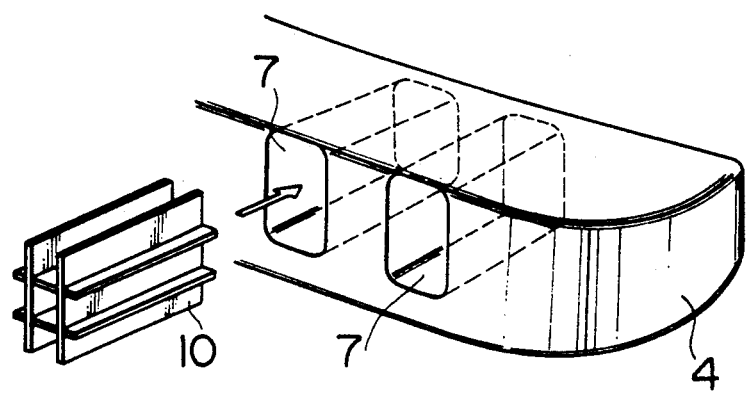

In the synthetic resin front bumper 1 constructed as described above, when a vehicle comes into a head-on collision with a wall, etc., the side wall 6 forming the through holes 7 of the absorber 4 is deformed by compression between the flange 9 of the bracket 5 and a wall (not shown) as shown in FIG. 6. Thus, a large load is generated in the absorber at an early stage of a collision phenomenon. FIG. 7 shows the relationship between load F and time T, and it is understood that a heavy load is generated at an early stage in the present embodiment shown with a chain line ② as compared with a conventional example shown with a solid line ①.

That is, in the front bumper 1 of the present embodiment, the absorption effect of the collision energy is increased comparing with a conventional bumper, the collision energy is absorbed in a short period of time, and deformation of the whole bumper is suppressed.

FIG. 8 thru FIG. 11 show a second embodiment of the present invention, in which lattice-formed structural bodies 10 made of synthetic resin are inserted and disposed in the through holes 7 provided in the absorber 4. These structural bodies 10 are formed of a synthetic resin material such as polyethylene, polypropylene or fiberglass reinforced plastic resin. Other construction is similar to that of above-mentioned first embodiment.

Figure 9:
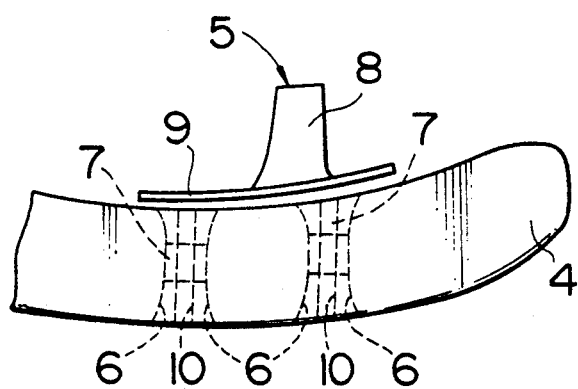
Figure 10:
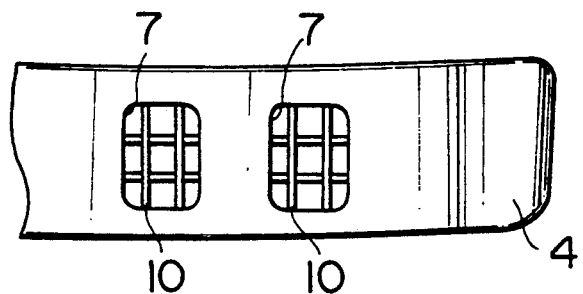
Figure 11:
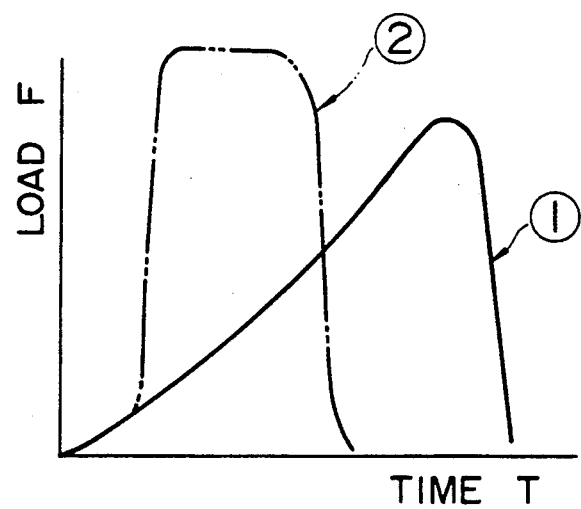

In the present embodiment, the wall 6 of the through holes 7 is prevented from being deformed by compression toward the inside as shown in FIG. 9 by means of the lattice-formed structural bodies 10, and increase of the load at an early stage of collision is noticed in particular as shown in FIG. 11. In FIG. 11, ① shows a conventional example and ② shows an embodiment. Thus, according to the present embodiment, it is possible to further increase the absorption effect of the collision energy comparing to the first embodiment. Besides, similar operation effects are obtainable by inserting rubber blocks of a high compressive strength into the through holes 7 in place of above-mentioned lattice-formed structural bodies 10.

Figure 12:
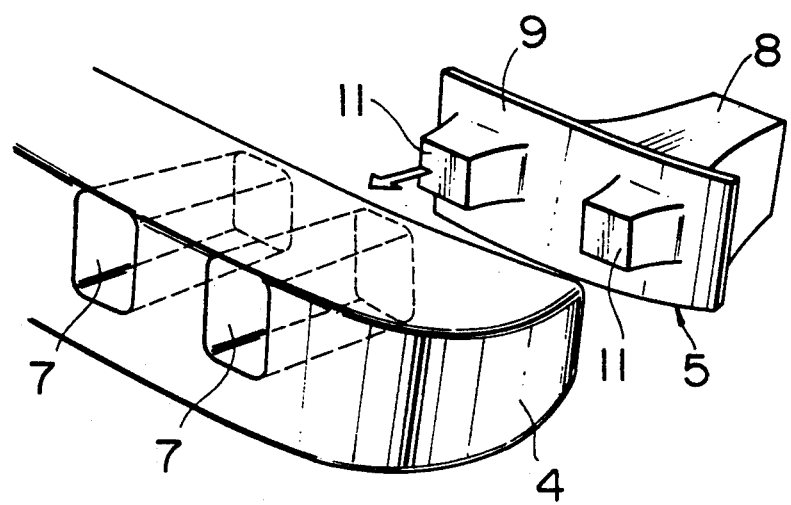
Figure 13:
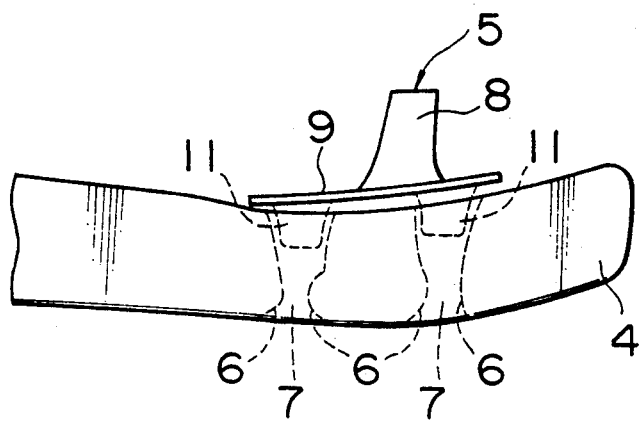
Figure 14:
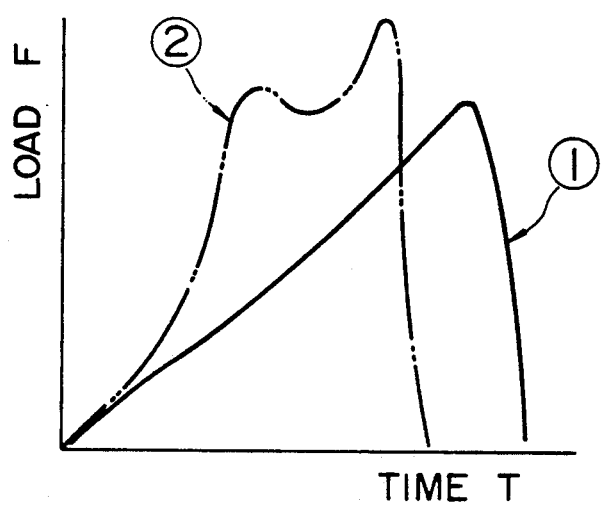
Figure 15:
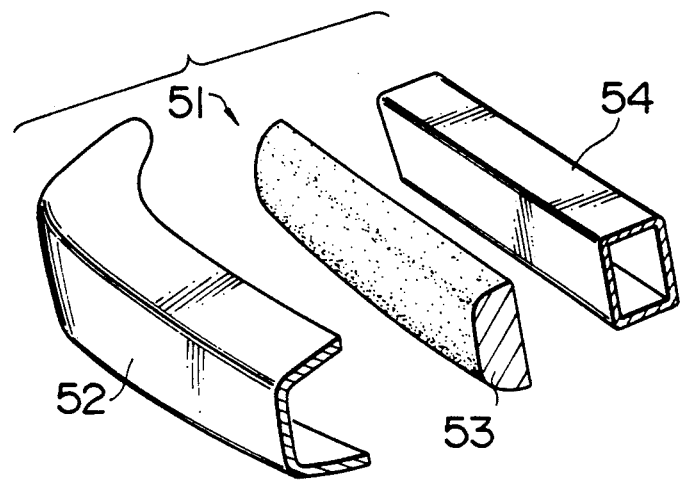
FIG. 15 is a perspective view showing a conventional synthetic resin bumper.
Figure 16:
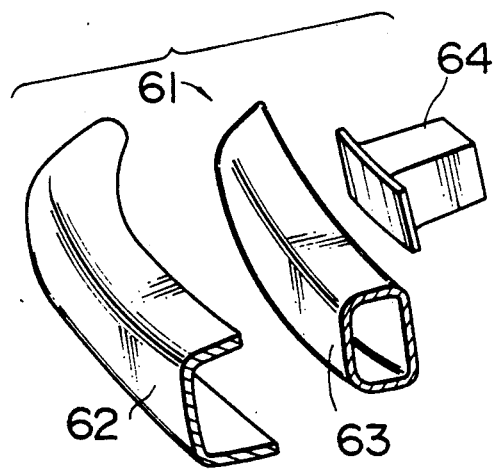
FIG. 16 is a perspective view showing another conventional synthetic resin bumper.
Figure 17:
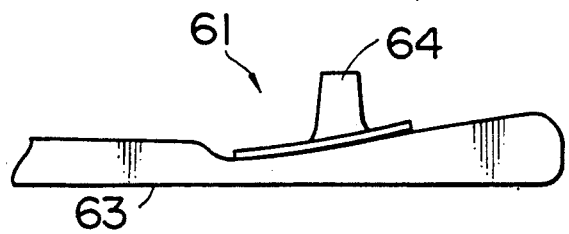
FIG. 17 is a plan view showing an absorber of above-mentioned bumper at the time of collision.

FIG. 12 thru FIG. 14 show a third embodiment of the present invention, in which projected portions 11 of the bracket 5 are inserted into through holes 7 provided in the absorber 4 from a direction shown with an arrow mark. These projected portions 11 are provided by having front face portions of the flange 9 at positions corresponding to the through holes 7 of the absorber 4 projected, and the overall size of the projected portion is formed smaller than the through hole 7. However, the projected portion 11 is required to be maintained at an appropriate projected quantity because, when the projected portion 11 is projected too much on the front face side of the absorber 4, it strikes violently against the collided wall, etc. and damages the bracket 5 badly. Other construction is similar to that of above-mentioned first embodiment.

In the present embodiment, the side wall 6 of the through holes 7 is prevented from falling inwardly by the projected portion 11 of the bracket 5 at the time of collision of a vehicle as shown in FIG. 13 and abuts against the wall at the time of collision, thus enabling to check deformation of the whole bumper. This is realized from the fact that a slightly higher load is produced at the last stage of collision as shown with a chain line ② of the present embodiment in FIG. 14.

An embodiment of the present invention has been described above, but the present invention is not limited to above-described embodiments, and variety of modifications and alterations are possible based on the technical thoughts of the present invention.

For example, the configuration of the front bumper 1 in above-described embodiment is not limited to that shown in the figures, but may be selected appropriately in accordance with an applied car type. Also, it is needless to say that the present invention is applicable to a rear bumper.

We claim:

1. A vehicle bumper, comprising:
    front right and front left fitting portions provided on a front end of a vehicle;
    a right bracket and a left bracket, each of said right and left bracket including a connection substrate positioned in an associated one of said fitting portions for support of said bracket and a flange portion having a front flange surface area larger than a cross sectional area of said substrate;
    a synthetic resin absorber with a continuous front face and a continuous rear face, said synthetic resin absorber including right first and second through holes and a left first and second through holes, each of said through holes being defined by side walls extending from said front face to said rear face, said right first and second through hole being spaced apart a predetermined distance and said left first and second through holes being spaced apart a predetermined distance, said right flange being fixedly connected to said synthetic resin absorber rear face covering openings of said right first and second through holes, said left bracket flange being fixedly connected to said synthetic resin absorber rear face and covering openings of said left first and second through holes.

2. A bumper according to claim 1 further comprising a lattice-formed structural body disposed in said through holes.

3. A bumper according to claim 1 wherein said flanges have projections which project into said through holes.

4. A bumper according to claim 1 further comprising a lattice-formed structural body disposed in said through holes, wherein said lattice-formed structural body is formed of resin.

* * * * *